United States Patent
Agrawal et al.

(10) Patent No.: US 9,311,628 B2
(45) Date of Patent: Apr. 12, 2016

(54) LOCATION-AWARE ADAPTIVE EVENT REMINDER

(75) Inventors: Ashvin Agrawal, Bangalore (IN); Subramaniam Venkatraman Krishnan, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 765 days.

(21) Appl. No.: 12/975,392

(22) Filed: Dec. 22, 2010

(65) Prior Publication Data

US 2012/0166075 A1 Jun. 28, 2012

(51) Int. Cl.
*G06Q 10/10* (2012.01)

(52) U.S. Cl.
CPC .......... *G06Q 10/109* (2013.01); *G06Q 10/1095* (2013.01)

(58) Field of Classification Search
CPC .................. G06Q 10/109; G06Q 10/1095
USPC ....................................................... 701/400
See application file for complete search history.

(56) References Cited

U.S. PATENT DOCUMENTS

| | | | |
|---|---|---|---|
| 5,790,974 A * | 8/1998 | Tognazzini | 455/456.5 |
| 6,618,716 B1 * | 9/2003 | Horvitz | 706/55 |
| 6,678,613 B2 * | 1/2004 | Andrews et al. | 701/468 |
| 6,944,539 B2 * | 9/2005 | Yamada et al. | 701/428 |
| 7,062,374 B1 * | 6/2006 | Walters et al. | 701/491 |
| 7,085,649 B2 * | 8/2006 | Baur et al. | 701/423 |
| 7,221,937 B2 * | 5/2007 | Lau et al. | 455/419 |
| 7,318,040 B2 * | 1/2008 | Doss et al. | 705/7.16 |
| 7,853,241 B1 * | 12/2010 | Harrison | 455/406 |
| 7,925,525 B2 * | 4/2011 | Chin | 705/7.19 |
| 7,933,815 B2 * | 4/2011 | Hutty et al. | 705/29 |
| 7,941,753 B2 * | 5/2011 | Meisels et al. | 715/751 |
| 2005/0227712 A1 * | 10/2005 | Estevez et al. | 455/456.3 |

* cited by examiner

*Primary Examiner* — Nicholas Kiswanto
(74) *Attorney, Agent, or Firm* — James J. DeCarlo; Greenberg Traurig, LLP

(57) ABSTRACT

An appointment having an associated appointment location and a reminder time is received. The method also includes tracking a current location and a travel time, the travel time comprising an estimated amount of time for travel from the current location to the appointment location. Further, the method includes adjusting the reminder time to accommodate the travel time. Furthermore, the method includes activating an event reminder in accordance with the adjusted reminder time.

20 Claims, 8 Drawing Sheets

LOCATION-AWARE ADAPTIVE EVENT REMINDER

FIELD OF THE INVENTION

This invention relates generally, to a calendaring application for a computing device, and more specifically, to providing location-aware event reminders.

BACKGROUND

Remembering important events and meetings is a cumbersome and challenging task for a user amidst the number of tasks the user needs to perform. As is evident, it is a common practice to schedule reminders for the important events. The reminders alert the user at a set amount of time (reminder time) prior to the commencement of the appointment. Most scheduling applications on mobile devices use dates and times for scheduling reminders. For example, a calendar application may signal an alert to remind a user of an upcoming appointment.

Typically, the reminder time is pre-configured. For example, a meeting alarm is usually configured to alert the user 15 minutes prior to the start of the meeting. However, the user may be at a location that is more than 15 minutes away from the meeting when the alert is received. In such a scenario, the alarm is not accurate and by the time the user reaches the event location, the event has started or even completed.

In light of the foregoing discussion, there is a need for an efficient method and system for providing location-aware event reminders.

SUMMARY

The above-mentioned needs are met by a method, system, and computer program product for providing location-aware event reminders.

An example of a method includes receiving an appointment having an associated appointment location and a reminder time. The method also includes tracking a current location and a travel time, the travel time comprising an estimated amount of time for travel from the current location to the appointment location. Further, the method includes adjusting the reminder time to accommodate the travel time. Furthermore, the method includes activating an event reminder in accordance with the adjusted reminder time.

An example of a computer program product includes receiving an appointment having an associated appointment location and a reminder time. The computer program product also includes tracking a current location and a travel time, the travel time comprising an estimated amount of time for travel from the current location to the appointment location. Further, the computer program product includes adjusting the reminder time to accommodate the travel time. Furthermore, the computer program product includes activating an event reminder in accordance with the adjusted reminder time.

An example of a system includes an interface module to receive an appointment having an associated appointment location and a reminder time. The system also includes a timer module to track a current location and a travel time, the travel time comprising an estimated amount of time for travel from the current location to the appointment location.

Advantageously, a user is alerted in time to travel to an event.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

A method, system, and computer program product for providing location-aware event reminders is disclosed. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
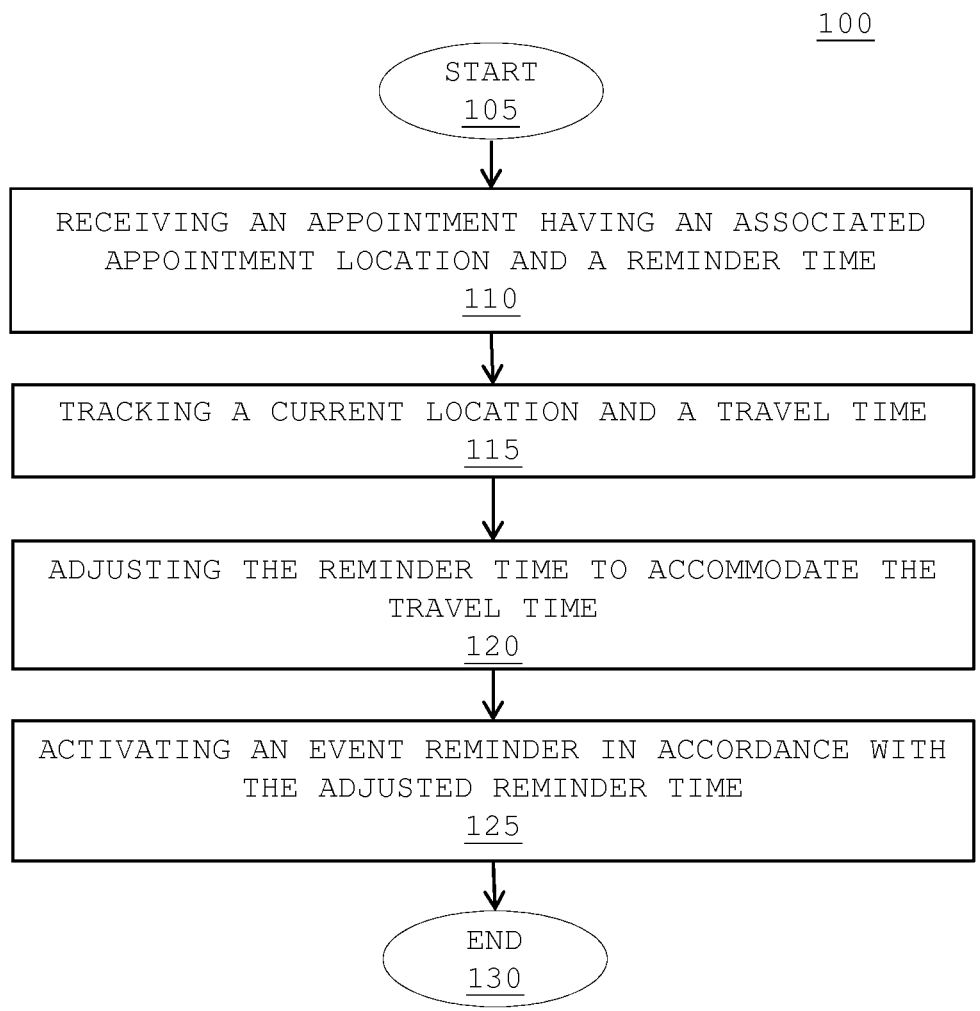
FIG. 1 is a flow diagram illustrating a method for providing location-aware event reminders according to one embodiment.

FIG. 1 is a flow diagram illustrating a method 100 for providing location-aware event reminders according to one embodiment of the present invention.

At step 110, an appointment having an associated appointment location and a reminder period is received from a user. In another embodiment, no reminder period is set. The user creates the appointment from a current location. The appointment may be a task list application or a calendar application (e.g., Yahoo! Calendar or Microsoft Outlook) to be performed at a particular location. At this point, the user chooses a date and time to set a reminder time to alert the user prior to the appointment. For example, if the user has an appointment at 5:00 PM on the 23 of Dec., 2010 in Los Angeles, then the reminder notifies the user, for example, 15 minutes prior to the appointment, i.e., at 4:45 PM on the 23 of December.

Location can be defined in several ways, not limited to, but including base station identifiers, latitude/longitude coordinates, and geographical mapping information such as names of cities, regions, countries, landmarks, sites (e.g., home, office), etc.

At step 115, a current location and a travel time is tracked. The current location may be tracked from a plurality of information. The information includes, but is not limited to, Global Positioning System (GPS)-based information, an Internet Protocol (IP) address, triangulation information and a user-inputted location.

In some embodiments the user device is a location aware device. The location aware device is capable of delivering information about the physical location of the user device to another user or an application. Examples of location aware device include but are not limited to a GPS mobile phone, General Packet Radio Services (GPRS) mobile phone and geo-location tagging on a laptop.

The current location of the user is tracked from at least one of a GPS-based location, an IP address, triangulation information and a user-inputted location. The GPS-based location can be obtained from any GPS-equipped device. The IP address is a numerical label that is assigned to any device in a computer network that uses Internet Protocol for communication. In one implementation, the IP address may be extracted from network packets during network browsing. In other implementations, the IP address along with nearby wireless access points are gathered and sent to a geolocation service provider. The geolocation service provider then estimates the current location and is shared with the requesting device. Triangulation information is obtained from cellular communications and pinpoints the geographic position of the user. The user-inputted location can be obtained when the user browses a website and opts to share the location details.

In some embodiments, the current location of the user can be also tracked by Wireless Fidelity (Wi-Fi) networks by comparing nearby Media Access Control (MAC) addresses. The MAC address is a unique hardware number assigned to a computer connected in a local area network (LAN) or any other network. In other embodiments, the current location can also be tracked by Hypertext Markup Language (HTML) files viewed by the user while browsing the web. Further, in other embodiments, the current location of the user can also be tracked by using bluetooth or Radio-frequency identification (RFID) based technologies. Bluetooth is an open wireless technology for exchanging data over short distances through short wavelength radio transmissions. RFID is a technology that uses communication through radio waves for the purpose of identification and tracking.

The travel time includes an estimated amount of time for the user to travel from the current location to the appointment location. Further, the travel time takes into account at least one of a plurality of factors. The factors include mode of transportation, traffic conditions and time of day. Mode of transportation can be any substantial way to perform transport, for example, aviation, road transport and rail transport. Traffic conditions signify the intensity of transportation movements. The time of day corresponds to changes in time zone from the current location to the appointment location.

In one embodiment, consider a user of a laptop in India. The user sets a reminder for an appointment. The user now travels to the United States before the occurrence of the appointment. The corresponding difference in time zones between India and the United States is computed to determine the travel time.

In another embodiment, a user logs into a desktop at location 'A' in California. The user sets a reminder for an appointment and then moves to another location 'B' in California. The user now logs into another desktop at location B. The travel time can be readjusted according to location 'B'. Other changes in travel time can be affected by changing traffic conditions, flight delays, weather, and the like.

At this point, the appointment location and the current location are sent to a mapping application. In response, the mapping application computes the travel time. In some embodiments, the travel time can be computed using Yahoo! Maps, Google maps or Yahoo! Calendar application. The travel time is then sent to the user device.

At step 120, the reminder time is adjusted to accommodate the travel time. The travel time is added to the reminder time dynamically. In one embodiment, a reminder time only includes travel time (i.e., user has not set a reminder period prior to the appointment time).

In one embodiment, a user logs in at a first personal computer (PC) at a first location. A first adjusted reminder time is set. Subsequently, the user logs in at a second PC at a second location. A second updated adjusted reminder time is set to override the first adjusted time reminder. In another embodiment, the event reminder can be manually adjusted.

At step 125, an event reminder is activated in accordance with the adjusted reminder time. The event reminder can be locally displayed to the user. Examples of reminders include a pop-up box on a display, an e-mail, a text message, an audible chirp, an automated telephone call, or any other technique for attracting user attention (e.g., temporarily dimming ambient lighting). In other embodiments, the adjusted reminders can be exported to other applications (e.g., a networked alarm clock).

Figure 2:
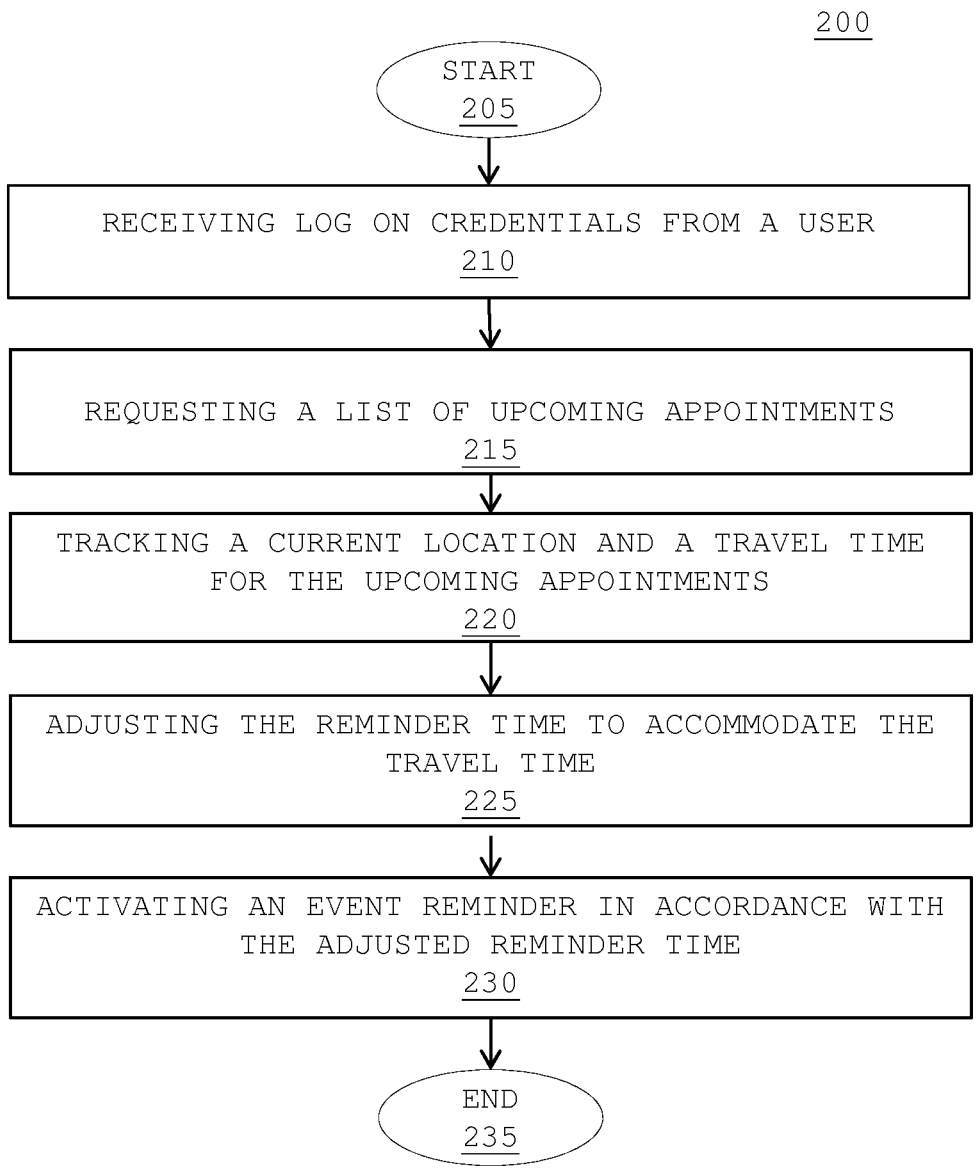
FIG. 2 is a flow diagram illustrating a method for providing location-aware event reminders according to another embodiment.

FIG. 2 is a flow diagram illustrating a method 200 for providing location-aware event reminders according to another embodiment of the present invention.

At step 210, log on credentials are received from a user. The user may further attempt to access a part of the web site that includes private information, such as financial data or personal e-mail messages (e.g., Yahoo! Mail). At this point, the user may be required to enter log-on credentials consisting of a user name and a password as verification.

At step 215, a list of upcoming appointments is requested. The list comprises of a sequence of appointments created by the user. The appointments can occur in various locations. In one embodiment, appointments can be imported from another application, or wirelessly synchronized.

At step 220, a current location and a travel time is tracked. The current location may be tracked from a plurality of information. The information includes, but is not limited to, GPS-based information, an IP address, triangulation information and a user-inputted location.

The travel time includes an estimated amount of time for the user to travel from the current location to the appointment location. Further, the travel time takes into account at least one of a plurality of factors. The factors include mode of transportation, traffic conditions and time of day.

At this point, the appointment location and the current location are sent to a mapping application. In response, the mapping application computes the travel time. In some embodiments, the travel time can be computed using Yahoo! Maps, Google maps or Yahoo! Calendar application. The application can be integrated by a service provider, or communication by use of APIs (Application Programming Interfaces). The travel time is then sent to the user device.

At step 225, the reminder time is adjusted to accommodate the travel time. The travel time is added to the reminder time dynamically. In one embodiment, a user is queried to verify the adjusted reminder time.

At step 230, an event reminder is activated in accordance with the adjusted reminder time. The event reminder can be locally displayed to the user.

FIGS. 3A-D are schematic diagrams illustrating exemplary location technologies according to some embodiments.

The user makes an attempt to access a part of a web site that includes private information, such as financial data or personal e-mail messages (e.g., Yahoo! Mail). At this point, the user may be required to enter log-on credentials consisting of a user name and a password as verification. The log-on credentials is received from the user by the log-on credentials 305. The log-on credentials is then sent to an interface module 310.

The interface module 310 (e.g., a graphical user interface) receives the log-on credentials. Further, the interface module 310 also receives enters an appointment. The appointment is associated with an appointment location and a reminder time. The appointment location signifies a geographic location (area, region, city, country etc.) at which the appointment would take place. The reminder time is the time at which the user desires to be alerted about the upcoming appointment.

In one embodiment, the interface module 310 receives the log-on credentials for a calendar application. With the log-on credentials details, the interface module 310 requests a list of upcoming appointments from the calendar application.

The details of the appointment location and the reminder time are then sent to a timer module 335. The timer module 335 is coupled in communication to the interface module 310 and tracks the current location of the user. Further, the timer module 335, tracks a travel time for the user to reach the appointment location.

The timer module 335, includes a GPS-based location module 315 and an appointment location module 320. The GPS-based location module 315 obtains information of a GPS-based location. Similarly, the appointment location module 320 stores the appointment location details. The appointment location and the current location are then sent to a mapping application 325. The mapping application 325, computes the travel time for the user to reach the appointment location and sends the travel time to the travel time module 330.

The reminder time is adjusted with the travel time. An event reminder is then activated in accordance with the adjusted reminder time. The user now is alerted about the appointment with travel time taken into account. This enables the user to reach the appointment location on time.

The interface module 310 displays the event reminder and further configures a calendar application in accordance with the event reminder.

In some embodiments, the interface module 310 and the timer module 335 are located on one of a mobile device, a smart cellular telephone, a PDA (Personal Desktop Assistant), a laptop device, or a personal computer.

Figure 3A:
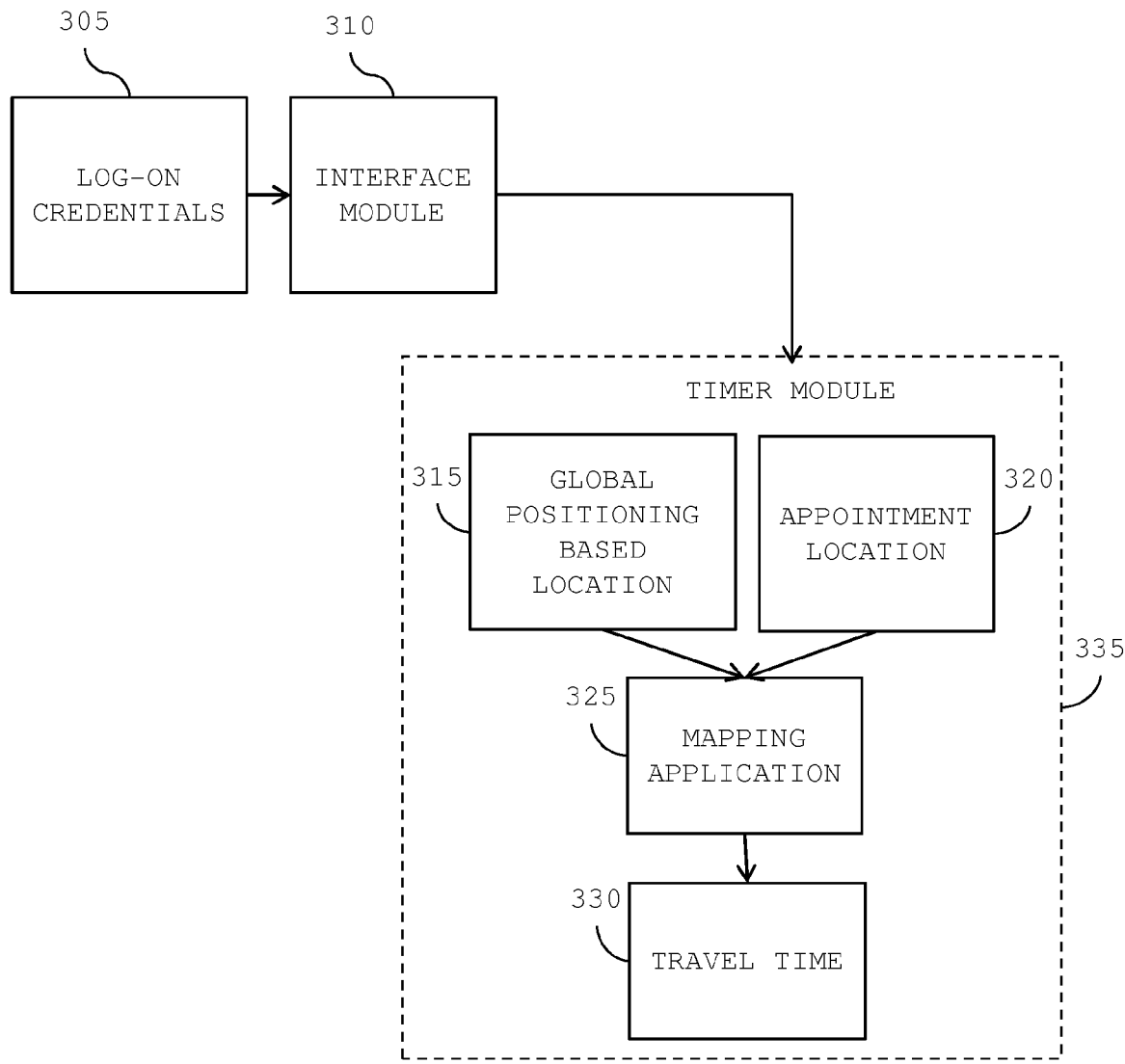
FIGS. 3A-D are schematic diagrams illustrating exemplary location technologies according to some embodiments
Figure 3B:
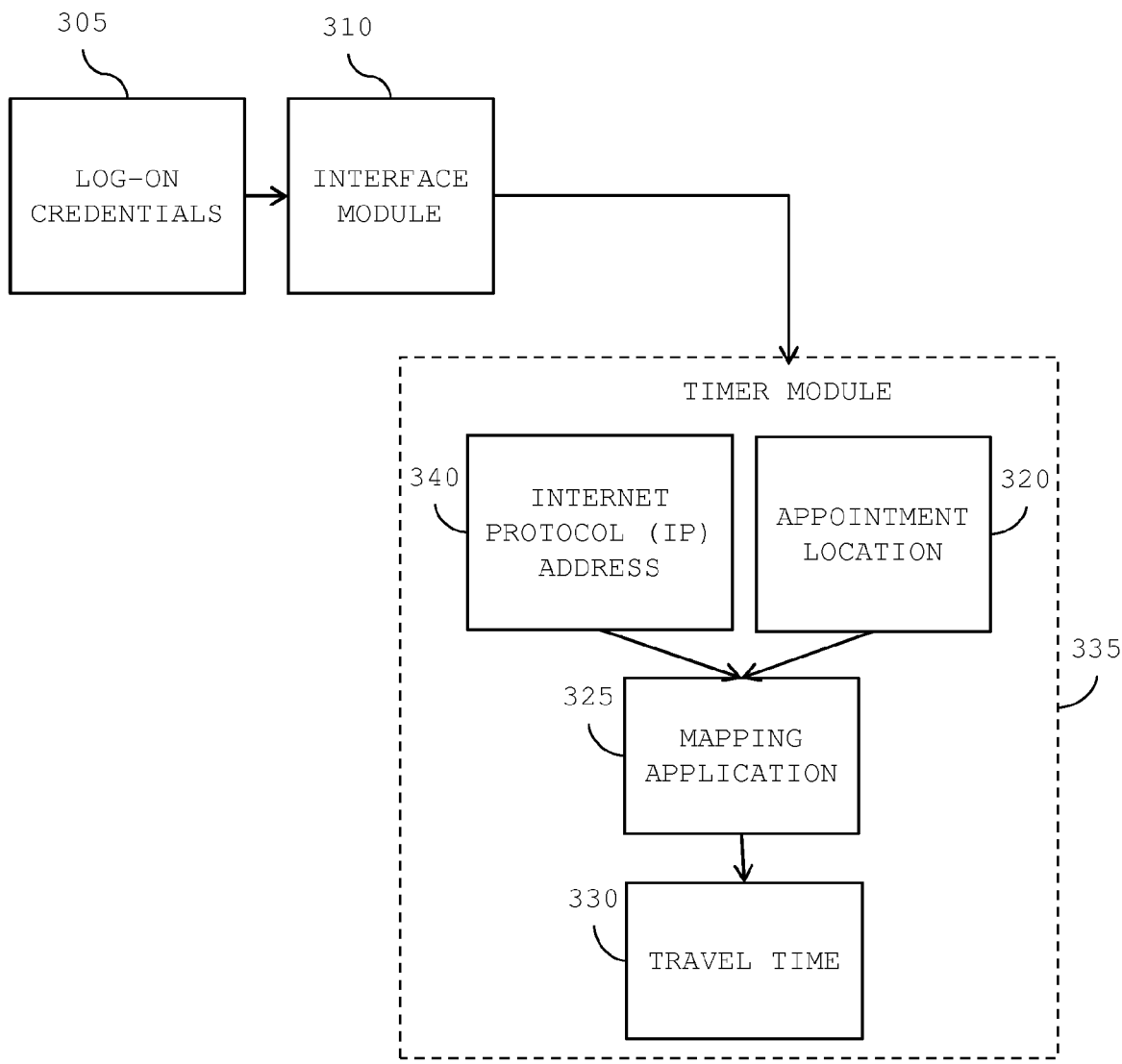

In one embodiment, the current location of the user can be obtained from the IP address of the computing device that the user handles. FIG. 3b illustrates the technology of obtaining the current location form the IP address.

Figure 3C:
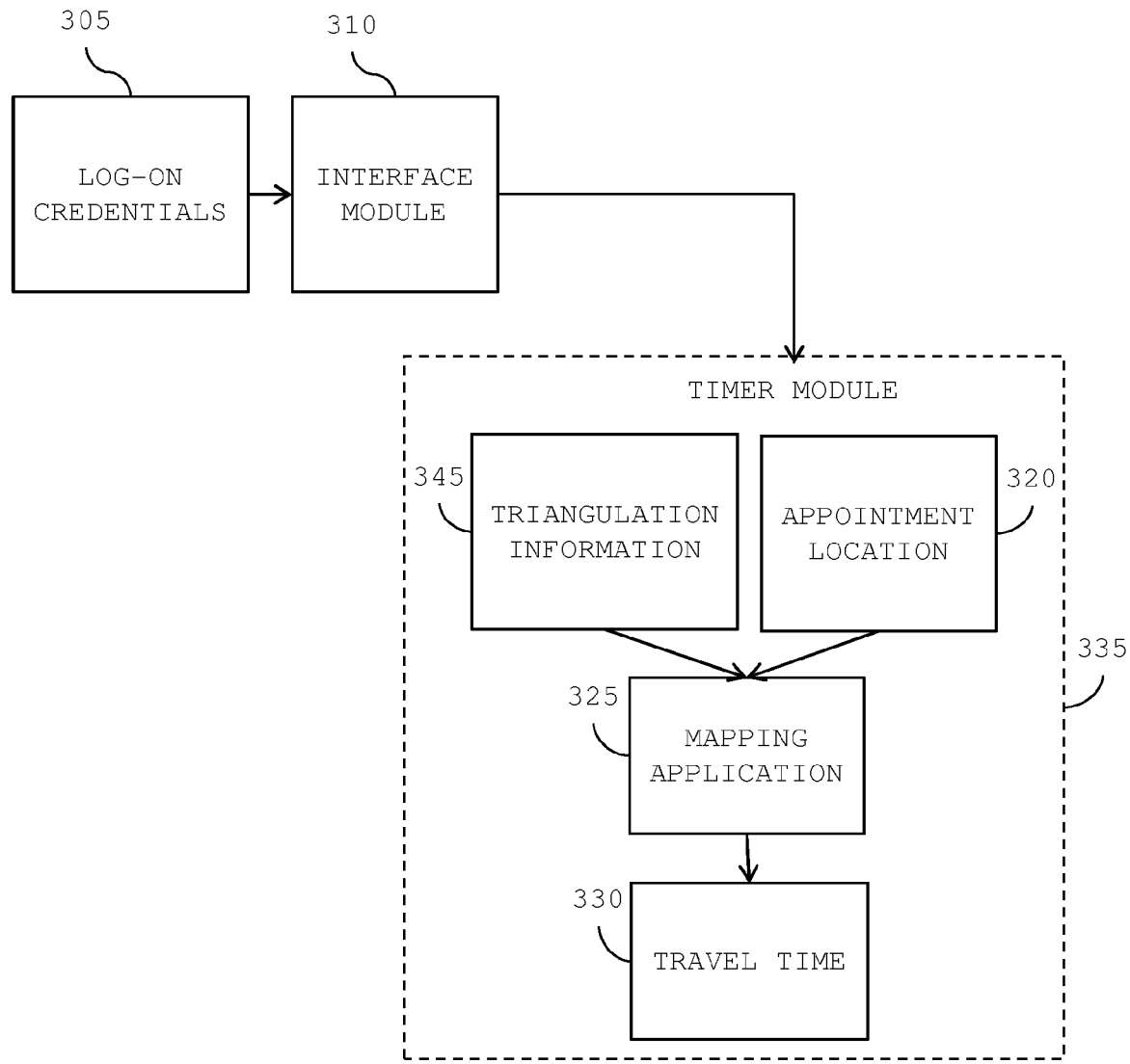

In another embodiment, the current location of the user can be obtained from triangulation information as shown in FIG. 3c.

Figure 3D:
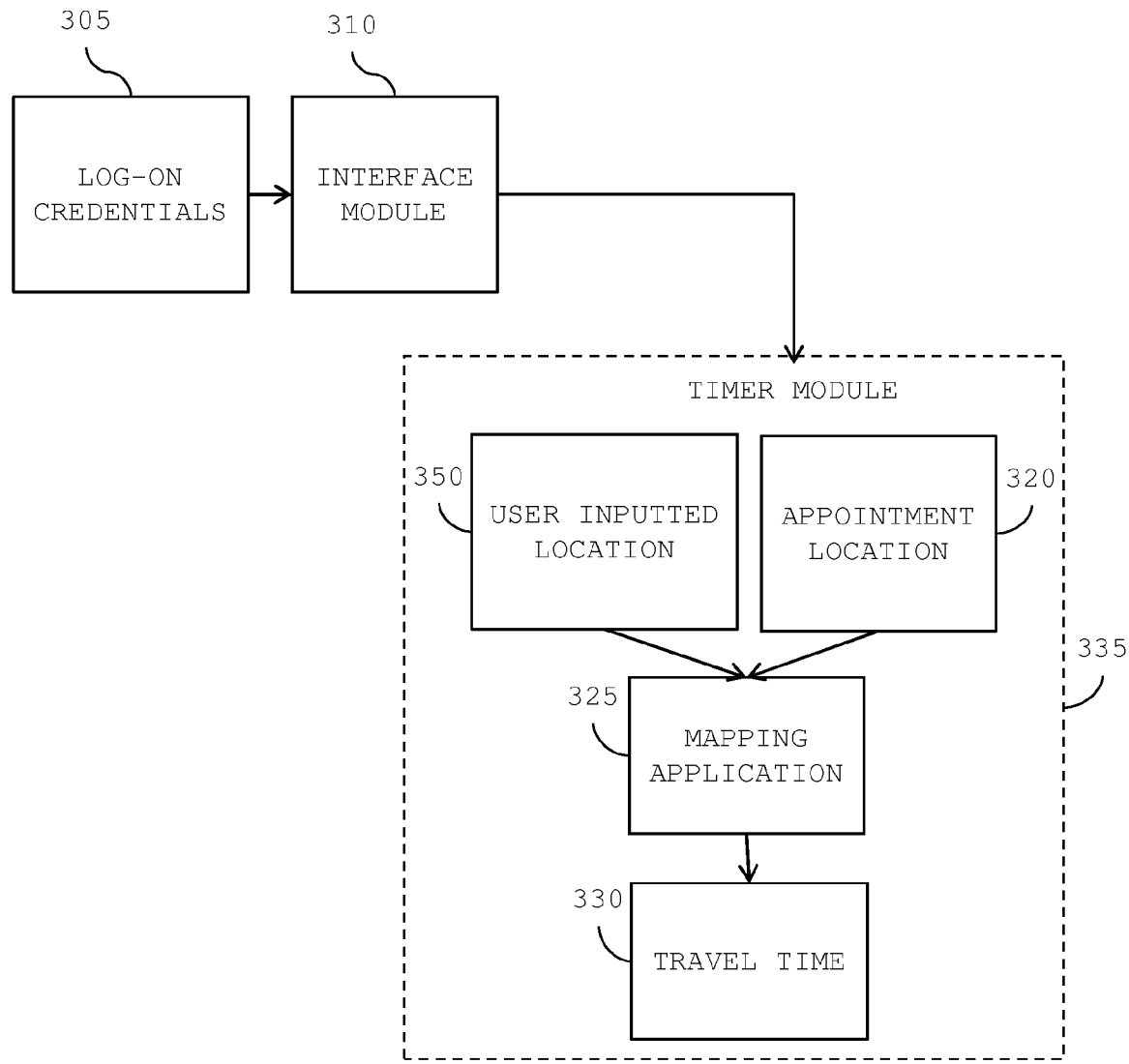

In yet another embodiment, the current location of the user can be obtained from the user-inputted information as shown in FIG. 3d.

Figure 4:
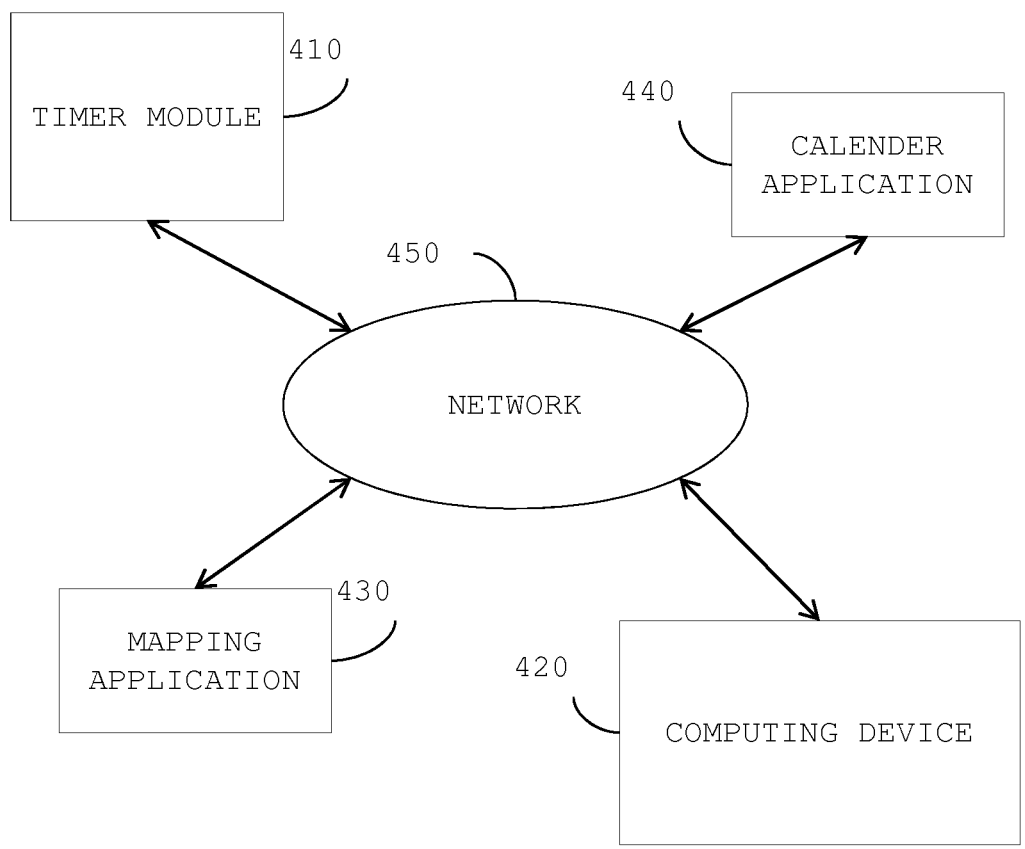
FIG. 4 is a block diagram illustrating system for providing location-aware event reminders according to one embodiment.

FIG. 4 is a block diagram illustrating system 400 for providing location-aware event reminders according to one embodiment. The system 400 includes a timer module 410, a computing device 420, a mapping application 430, and a calendar application 440 coupled in communication through a network 450.

The timer module 410 tracks the current location of the user on receiving one of a GPS-based location, an IP address, triangulation information and a user-inputted location.

The computing device 420 can be, for example, a PC, a stationary computing device, a laptop or notebook computer, a tablet computer, a smart phone or PDA, a smart appliance, or any other suitable processor-based device. In one embodiment, the computing device 420 is a location-aware device. The location aware device is capable of signaling the corresponding physical location of the computing device 420. Additional embodiments of the computing device 420 are described in more detail below.

The mapping application 430 receives information corresponding to the current location of the user device and the appointment location. Upon receiving the information, the mapping application 430 computes the travel time for the user in order to reach the appointment location form the current location. The travel time is then sent to the timer module 410.

The calendar application 440 can be remotely located and manages a plurality of appointments of the user. In one embodiment, the calendar application 440 may also be located in the computing device 420. In another embodiment, the calendar application 440 can be integrated with the mapping application 430.

In some embodiments, the timer module 410, the calendar application 440 and the mapping application 430 can be located in the computing device.

Figure 5:
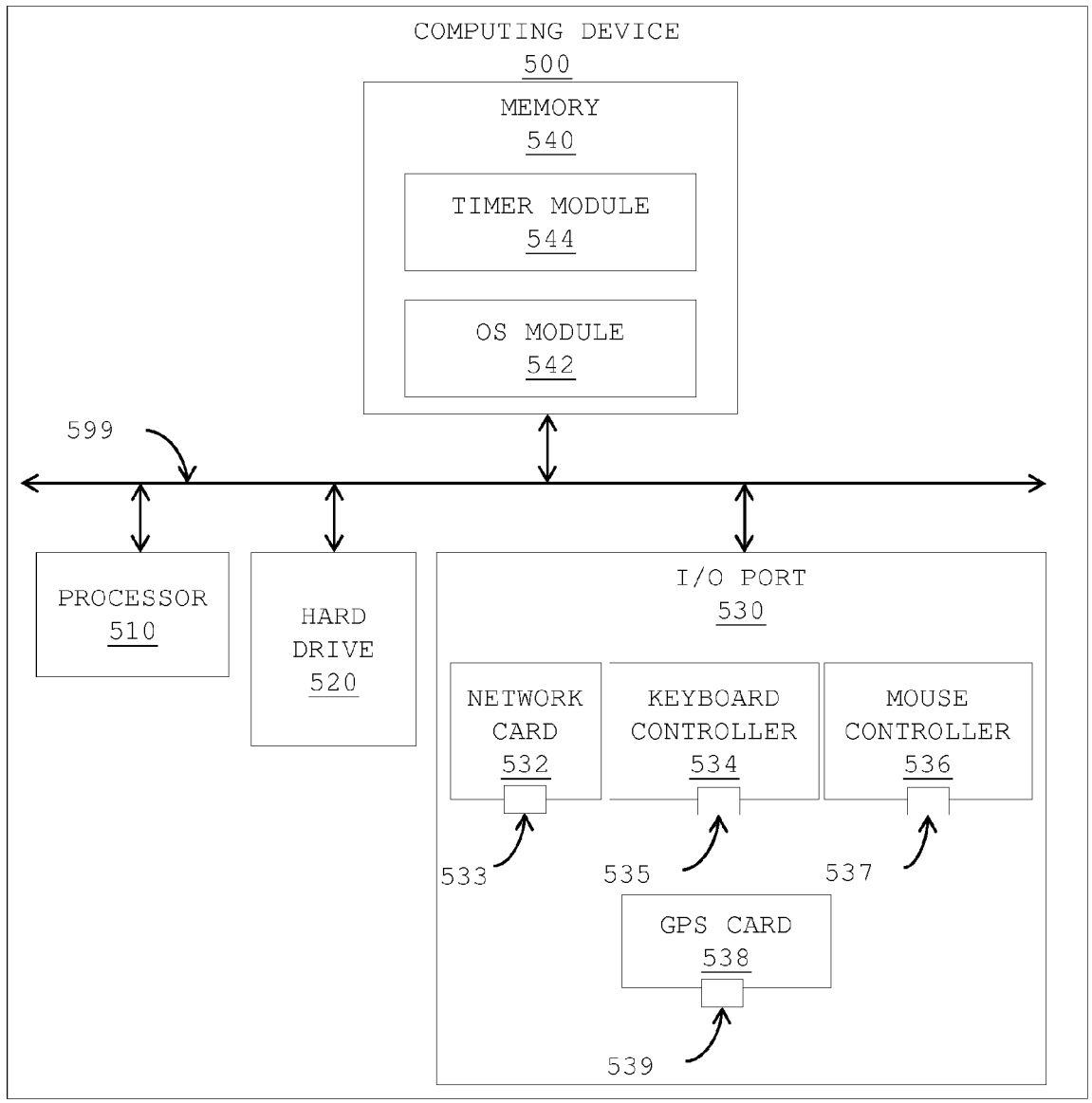
FIG. 5 is a block diagram illustrating a mobile computing device according to one embodiment.

FIG. 5 is a block diagram illustrating a mobile computing device 500 according to one embodiment of the present invention. The computing device 500 is an exemplary implementation of the computing device 420 of FIG. 4.

The computing device 500 includes a processor 510, a hard drive 520, an I/O port 530, and a memory 540, coupled by a bus 599.

The bus 599 can be soldered to one or more motherboards. The processor 510 can be a general purpose processor, an application-specific integrated circuit (ASIC), an FPGA (Field Programmable Gate Array), a RISC (Reduced Instruction Set Controller) processor, an integrated circuit, or the like. There can be a single core, multiple cores, or more than one processor. In one embodiment, the processor 510 is specially suited for the processing demands of location-aware reminders (e.g., custom micro-code, instruction fetching, pipelining or cache sizes). The processor 510 can be disposed on silicon or any other suitable material. In operation, the processor 510 can receive and execute instructions and data stored in the memory 540 or the hard drive 520. The hard drive 520 can be a platter-based storage device, a flash drive, an external drive, a persistent memory device, or any other type of memory.

The hard drive 520 provides persistent (i.e., long term) storage for instructions and data. The I/O port 530 is an input/output panel including a network card 532 with an interface 533, along with a keyboard controller 534, a mouse controller 536, and a GPS card 538. The network card 532 can be, for example, a wired networking card (e.g., a USB card, or an IEEE 802.3 card), a wireless networking card (e.g., an IEEE 802.11 card, or a Bluetooth card), and a cellular networking card (e.g., a 3G card). The interface 533 is configured according to networking compatibility. For example, a wired networking card includes a physical port to plug in a cord, and a wireless networking card includes an antennae. The network card 532 provides access to a communication channel on a network. The keyboard controller 534 can be coupled to a physical port 535 (e.g., PS/2 or USB port) for connecting a keyboard. The keyboard can be a standard alphanumeric keyboard with 101 or 104 keys (including alphabetic, numerical and punctuation keys, a space bar, modifier keys, etc.), a laptop or notebook keyboard, a thumb-sized keyboard, a virtual keyboard, or the like. The mouse controller 536 can also be coupled to a physical port 537 (e.g., mouse or USB port). The GPS card 538 provides communication to GPS satellites operating in space to receive location data. An antenna 539 provides radio communications (or alternatively, a data port can receive location information from a peripheral device).

The memory 540 can be a RAM (Random Access Memory), a flash memory, a non-persistent memory device, or any other device capable of storing program instructions being executed. The memory 540 comprises an OS module 542 along with a timer module 544. In other embodiments, the memory 540 comprises a calendar application that manages a plurality of appointments. The OS module 542 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The timer module 544 can be implemented in the memory 540 as shown, have hardware assist, or be implemented completely in hardware. In one embodiment, the timer module 544 takes travel time into account to adjust event reminders in a calendaring application as discussed herein.

In other embodiments, the timer module 544 can be implemented to adjust other time-based events besides appointments. For example, when a printer cartridge is nearing the end of its useful lifecycle, the timer module 544 can calculate the time needed to order parts in addition to the time to failure. As a result, a reminder to replace the printer cartridge can be deployed with ordering time taking into account. In still other embodiments, the timer module 544 can be implemented into an automobile reminder system for oil changes or service, and adjust the associated reminders for an estimated wait for an appointment. In one example, the timer module 544 can be networked to access an appointment schedule from a preferred dealer.

As described herein, computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). Many of the functionalities described herein can be implemented in computer software, computer hardware, or a combination.

Furthermore, the computer that is running the previously mentioned computer software may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   receiving, by a processor, an appointment having an associated appointment location and a reminder time;
   tracking, by the processor, a current location and a travel time, the travel time comprising an estimated amount of time for travel from the current location to the appointment location, the travel time taking into account a mode of transportation and traffic conditions;
   adjusting, by the processor, the reminder time to accommodate the travel time;
   querying, by the processor, a user to verify the adjusted reminder time; and
   activating, by the processor, an event reminder in accordance with the adjusted reminder time.

2. The method of claim 1, wherein tracking the current location comprises:
   tracking the current location from at least one of receiving a GPS-based location,
   receiving an IP address,
   receiving triangulation information, and
   receiving a user-inputted location.

3. The method of claim 1, wherein the travel time takes into account time of day.

4. The method of claim 1, wherein tracking the current location comprises:

sending the appointment location and the current location to a mapping application; and receiving the travel time from the mapping application.

5. The method of claim 1, further comprising:
receiving log on credentials for a calendar application; and
using the log on credentials to request a list of upcoming appointments from the calendar application.

6. The method of claim 1, wherein activating the event reminder comprises at least one of:
locally displaying the event reminder and configuring a calendar application in accordance with the event reminder.

7. A non-transitory computer-readable storage medium that when executed by a processor, performs a method for providing location-aware event reminders, comprising:
receiving, by the processor, an appointment having an associated appointment location and a reminder time;
tracking, by the processor, a current location and a travel time, the travel time comprising an estimated amount of time for travel from the current location to the appointment location, the travel time taking into account a mode of transportation and traffic conditions;
adjusting, by the processor, the reminder time to accommodate the travel time;
querying, by the processor, a user to verify the adjusted reminder time; and
activating, by the processor, an event reminder in accordance with the adjusted reminder time.

8. The non-transitory computer readable storage medium of claim 7, wherein tracking the current location comprises: tracking the current location from at least one of receiving a GPS-based location, receiving an IP address, receiving triangulation information, receiving a user-inputted location.

9. The non-transitory computer readable storage medium of claim 7, wherein the travel time takes into account time of day.

10. The non-transitory computer readable storage medium of claim 7, wherein tracking the current location comprises:
sending the appointment location and the current location to a mapping application; and
receiving the travel time from the mapping application.

11. The non-transitory computer readable storage medium of claim 7, further comprising:
receiving log on credentials for a calendar application; and
using the log on credentials to request a list of upcoming appointments from the calendar application.

12. The non-transitory computer readable storage medium of claim 7, wherein activating the event reminder comprises at least one of:

locally displaying the event reminder and configuring a calendar application in accordance with the event reminder.

13. A system comprising:
a processor;
a storage medium for tangibly storing thereon program logic for execution by the processor, the program logic comprising:
an interface module to receive an appointment having an associated appointment location and a reminder time;
a timer module, coupled in communication with the interface module, the timer module to track a current location and a travel time, the travel time comprising an estimated amount of time for travel from the current location to the appointment location, the timer module to adjust the reminder time to accommodate the travel time, the travel time taking into account a mode of transportation and traffic conditions; and
a query module to query a user to verify the adjusted reminder time,
wherein the interface module activates an event reminder in accordance with the adjusted reminder time.

14. The system of claim 13, wherein the timer module tracks the current location from at least one of receiving a GPS-based location, receiving an IP address, receiving triangulation information, receiving a user-inputted location.

15. The system of claim 13, wherein the travel time takes into account time of day.

16. The system of claim 13, wherein tracking the timer module sends the appointment location and the current location to a mapping application, and receives the travel time from the mapping application.

17. The system of claim 13, wherein the interface module receives log on credentials for a calendar application, and uses the log on credentials to request a list of upcoming appointments from the calendar application.

18. The system of claim 13, wherein the interface module performs at least one of locally displaying the event reminder and configuring a calendar application in accordance with the event reminder.

19. The system of claim 13, further comprising:
a remotely located calendar application to manage a plurality of appointments including the appointment,
wherein the interface module and the timer module are located on a local mobile device.

20. The system of claim 13, wherein the interface module and the timer module are located on one of a mobile device, a cellular telephone, a PDA, a laptop device, and a personal computer.

* * * * *